United States Patent [19]

Vagi

[11] 4,380,086
[45] Apr. 12, 1983

[54] RADIATION IMAGING SYSTEM WITH CYCLICALLY SHIFTABLE GRID ASSEMBLY

[75] Inventor: Robert J. Vagi, Broadview Heights, Ohio

[73] Assignee: Picker Corporation, Cleveland, Ohio

[21] Appl. No.: 209,309

[22] Filed: Nov. 24, 1980

[51] Int. Cl.³ ............................................. A61B 6/00
[52] U.S. Cl. ................................................. 378/155
[58] Field of Search ........................ 250/509; 378/155

[56] References Cited

U.S. PATENT DOCUMENTS

| | | | |
|---|---|---|---|
| 2,554,051 | 5/1951 | Newton | 250/509 |
| 2,591,536 | 4/1952 | Gieringer et al. | 250/509 |
| 2,864,004 | 12/1958 | Nemet et al. | 250/509 |

Primary Examiner—Alfred E. Smith
Assistant Examiner—T. N. Grigsby
Attorney, Agent, or Firm—Watts, Hoffman, Fisher & Heinke

[57] ABSTRACT

An X-ray spot filmer is disclosed including a system for cyclically shifting a grid assembly interposed between an X-ray source and a film cassette. The system comprises an electrically energizable grid assembly actuator and an actuator controller for energizing the actuator to cyclically shift the grid assembly. The actuator controller includes actuator energizing output circuitry effective to govern the direction and speed of operation of the actuator in response to a control signal and control signal generator circuitry for producing control signals effective to govern operation of the output circuitry including an oscillator for producing a cyclically varying control signal which causes cyclic grid assembly shifting.

13 Claims, 3 Drawing Figures

RADIATION IMAGING SYSTEM WITH CYCLICALLY SHIFTABLE GRID ASSEMBLY

TECHNICAL FIELD

The present invention relates to an apparatus for cyclically shifting a grid in a system for producing a transparency image of an object subjected to penetrative radiation so that the grid does not appear in the transparency image.

BACKGROUND ART

Systems for producing transparency images by passing penetrative radiation through a subject and impinging it on an image producing element, such as a photographic film or paper, generally employ one or more radiation absorbing grid assemblies interposed between the radiation source and of the film. The grid assemblies reduce clouding of the photographic image which otherwise results from the effects of scattered radiation. Because of the radiation absorbing property of the grid assemblies, images interposing grid assemblies between the radiation source and the image producing elements can result in a grid image being formed on the image producing elements. Various steps have been taken to minimize such grid images.

The construction of most grid assemblies is accomplished using thin strips of radiation absorbent material, such as lead, oriented edgewise with respect to the radiation source. Radiation sources such as X-ray tubes are, for practical purposes, point sources of the radiation. Therefore the grid assemblies are constructed so that each grid strip extends edgewise and radially with respect to the radiation source focal spot when the grid assembly is in its exposure position between the radiation source and the image producing element. Aligning the grid strips edgewise to the direction of radiation from the focal spot substantially reduces the extent of the grid images produced during exposures, but requires that the grid assemblies be accurately located at predetermined exposure positions. Significant misalignment creates undesired grid strip images and severely reduces the quantity of radiation passing through the grid assembly.

The prior art has also suggested moving the grid assemblies during the time an exposure is made to effectively "blur" the grid image which might otherwise be produced. Because of the grid strip alignment with the radiation source the grid assemblies, when moved during an exposure, cannot be moved far from their exposure positions without the grid strips and source becoming excessively misaligned. Grid assembly motion has therefore commonly been of a cyclic nature with the grid assemblies moved relatively short distances.

The prior art has proposed various schemes for moving grid assemblies during exposure. In some proposals grid assemblies have been supported, at least in part, by resiliently flexible springs which are loaded and released just prior to an exposure being made. The grid assembly is oscillated by the springs whose oscillations are naturally dampened by friction and thus remain pronounced during the period of the exposure.

One problem with the use of grid assembly oscillating springs has been that the grid assembly motion is generally sinusoidal in nature. That is to say, the grid assembly velocities tend to be quite low during a relatively appreciable interval when the grid assembly is in the vicinity of its limits of travel. This results in the grid assembly being imaged when stopped or moving slowly.

If radiation exposure times are relatively brief, there is a chance the exposure could occur when the grid assembly is nearly stationary at an end of its oscillatory travel and a grid image can be produced. If exposure times are in excess of one or two seconds, the grid assemblies repeatedly slow and stop at substantially the same locations tend to "build up" composite grid images.

An alternative approach, suggested by the disclosure of U.S. Pat. No. 2,767,323 issued to Stava et al. on Oct. 16, 1956, employs a motor driven cam for oscillating the grid assembly. The cam drives the grid at relatively low frequency oscillations, but the cam profile is configured so that the grid assembly velocity remained relatively constant up to the point at which the grid assembly changes directions. The grid assembly motion is thus not sinusoidal.

Furthermore, the Stava patent suggests the inclusion of a switching arrangement by which a short, high intensity exposure is prevented while the grid assembly is momentarily stopped at its limit of travel. For long duration exposures the switching arrangement is not used because of the low oscillation frequency.

The construction of these grid assembly oscillating arrangements has been such that the grid assembly oscillation frequencies and grid assembly velocities have had to be relatively low in order to provide adequate grid motion with small oscillation amplitudes. This has been particularly true of spring supported grid assemblies, although the cam driven grid approaches have also depended on relatively low frequency operation so that grid assembly motion is assured throughout the major extent of most exposures without discontinuing the exposure at the limits of grid assembly travel.

DISCLOSURE OF THE INVENTION

The present invention provides a new and improved method and apparatus for cyclically shifting a grid assembly in a penetrative radiation imaging system wherein the grid assembly is interposed at an exposure position between a source of penetrative radiation and an image forming element and oscillated transverse to the direction of the radiation. The displacement of the grid from the exposure position is altered during successive oscillations so that the maximum grid assembly displacement in one direction of motion from the exposure position is not repeated for a time which is relatively large compared to the maximum expectable exposure time.

In accordance with one important feature of the invention the grid assembly is oscillated relative to its exposure position and vibrated at a relatively higher frequency while oscillating to prevent the grid assembly from becoming momentarily stationary repeatedly at one location during an exposure.

A preferred and illustrated embodiment of the invention employs a grid assembly actuator system for moving the grid assembly between retracted and exposure positions as well as cyclically moving the grid assembly during exposures. The actuator system includes an actuator and actuator controller, the latter being effective to govern operation of the actuator in positioning the grid assembly and cyclically moving it. The actuator controller includes first and second signal generators which simultaneously produce cyclic actuator controlling signals having different frequencies, with the actuator being operated as a function of the cyclic actuator controlling signals.

Other features and advantages of the invention will become apparent from the following detailed description of a preferred embodiment of the invention made with reference to the accompanying drawings which form part of the specification.

BEST MODE FOR CARRYING OUT THE INVENTION

Figure 1:
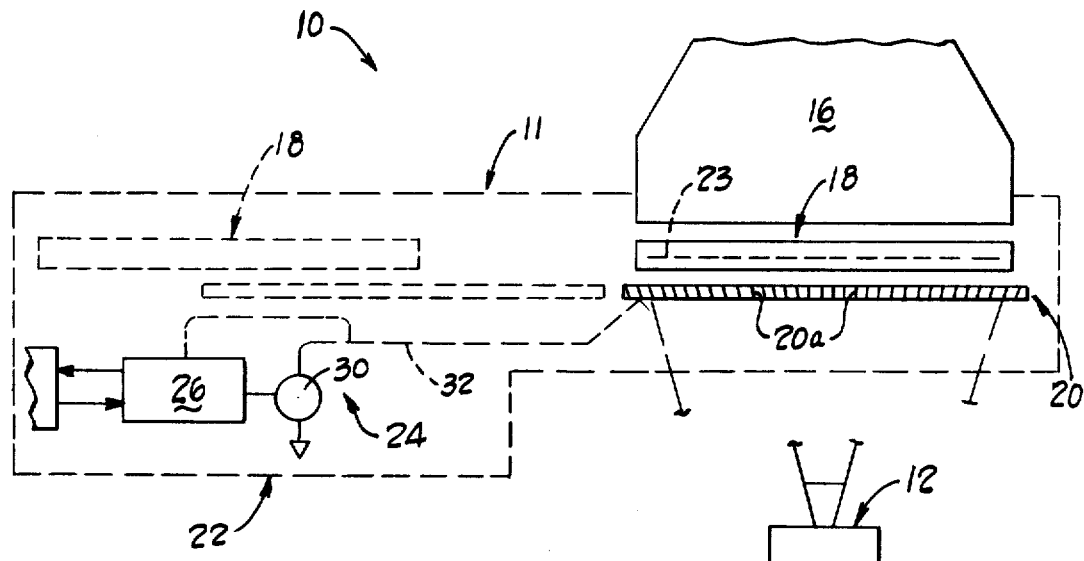
FIG. 1 is a schematic representation of a radiation imaging system constructed according to the invention with portions removed.

A penetrative radiation image producing system 10 embodying the present invention is illustrated by FIG. 1 of the drawings in the form of an X-ray spot filmer 11 (schematically illustrated) associated with a source of penetrative radiation 12 (such as an X-ray tube) located beneath the top of a subject supporting table (not illustrated). Penetrative radiation from the source 12 is directed through a subject to the spot filmer 11 where a transparency image of the subject is produced.

The spot filmer 11 functions to produce a fluoroscopic image of the subject or, alternatively, one or more photographic images. Accordingly, the spot filmer 11 is illustrated as supporting a fluoroscopic imaging device 16, only a part of which is shown, an X-ray film cassette 18, a grid assembly 20 and a grid assembly actuator system 22. The cassette 18 is of conventional construction and contains a photosensitive element in the form of a sheet of film 23 extending in a plane transverse to the direction of radiation from the source 12.

The cassette is associated with a cassette actuating system (not illustrated) by which the cassette can be moved from a cassette loading and unloading location (illustrated by broken lines) to any of a number of exposure positions. The cassette actuating system is constructed so that various selectible areas of the cassette can be centered over the X-ray tube to permit multiple separate exposures of a single film sheet. The spot filmer 11 is equipped with adjustably movable X-ray absorbtive masks (not shown) which can be shifted as desired to govern the size and shape of the X-ray beam envelope impinging on the film sheet.

The grid assembly 20 functions primarily to minimize the amount of scatter radiation impinging on the film sheet 23 and is movable between an exposure position, where it is interposed between the source 12 and the cassette 18, and a retracted position illustrated by broken lines in FIG. 1. The grid assembly preferably comprises thin strips 20a of lead extending generally parallel to each other in a plane parallel to that of the film sheet. Each grid strip 20a is supported on edge in the grid assembly in a plane extending through the radiation source focal spot so that the grid assembly functions like a collimator intending to absorb radiation incident upon it which does not come from the direction of the focal spot. The grid strips are supported in their positions by suitable grid housing members, not illustrated.

A second grid assembly, not illustrated, may also be supported by the spot filmer adjacent the plane of the grid assembly 20. The second grid assembly comprises grid strips extending orthogonally with respect to the grid strips of the assembly 20 and oriented edgewise with respect to the radiation focal spot in the manner described in connection with the grid strips 20a. The second grid assembly is moved between exposure and retracted positions by an associated actuator system; but, in the preferred embodiment, is not cyclically shifted during exposures.

The grid assembly actuator system 22 functions to shift the grid assembly between its exposure and retracted positions as well as to cyclically shift the grid relative to its exposure position while the film sheet is being exposed to radiation from the source. Cyclically shifting the grid assembly substantially avoids images of the radiation absorbtive grid strips 20a from being created on the film. In the preferred embodiment of the invention the actuator system 22 comprises a grid assembly actuator 24 and an actuator controller 26 which governs operation of the actuator 24. The spot filmer includes a central control unit, not illustrated, which transmits command signals to the controller 26 for governing the grid assembly actuator 24 as well as controlling the other functions of the spot filmer and operation of the X-ray tube. A preferred central control unit employs microprocessors for automatically operating the spot filmer in accordance with a suitable program after initial manual selection of desired operating parameters. It should be appreciated that a so-called hard wired control unit can be employed to operate the spot filmer if desired.

When the spot filmer 11 is used to produce a fluoroscopic image the cassette 18, one or both grid assemblies, and the radiation opaque masks are retracted to enable the X-ray beam to be directed onto the full face of the fluoroscopic image device 16. When photographic images are desired the cassette 18, the grid assemblies and the masks are shifted to respective exposure positions in the X-ray beam for making exposures under control of the central control unit.

The spot filmer 11 is schematically illustrated with numerous parts not shown for purpose of simplifying the disclosure. A preferred spot filmer construction is illustrated and described in greater detail in a copending application of Robert P. Hunt and John D. Geither entitled Spotfilming Apparatus and Method and filed concurrently herewith, the disclosure of which is incorporated herein in its entirety by this reference to it. Reference should be made to that application for a more detailed understanding of the spot filmer construction which has been generally referred to here. It should further be understood that the principles of the present invention are applicable to any penetrative radiation imaging system utilizing a scatter radiation reducing grid assembly whether or not such system be in the form of a spot filmer and therefore many constructional features of the preferred spot filmer 11 are neither disclosed here nor necessary to a complete understanding of the invention.

The grid assembly actuator 24 comprises a reversible electric motor 30 connected to the grid assembly by a drive transmission 32 schematically represented; but preferably formed by a chain transmission having a light-weight chain reaved around a motor driven sprocket and fixed to the grid assembly 20 to translate the assembly in accordance with the speed and direction of operation of the motor 30. The chain transmission 32 is so constructed and arranged that it shifts the grid assembly 20 between its exposure and retracted positions as well as cyclically shifting the grid assembly relative to the exposure position during exposures in a fashion which is discussed presently.

Figure 2:
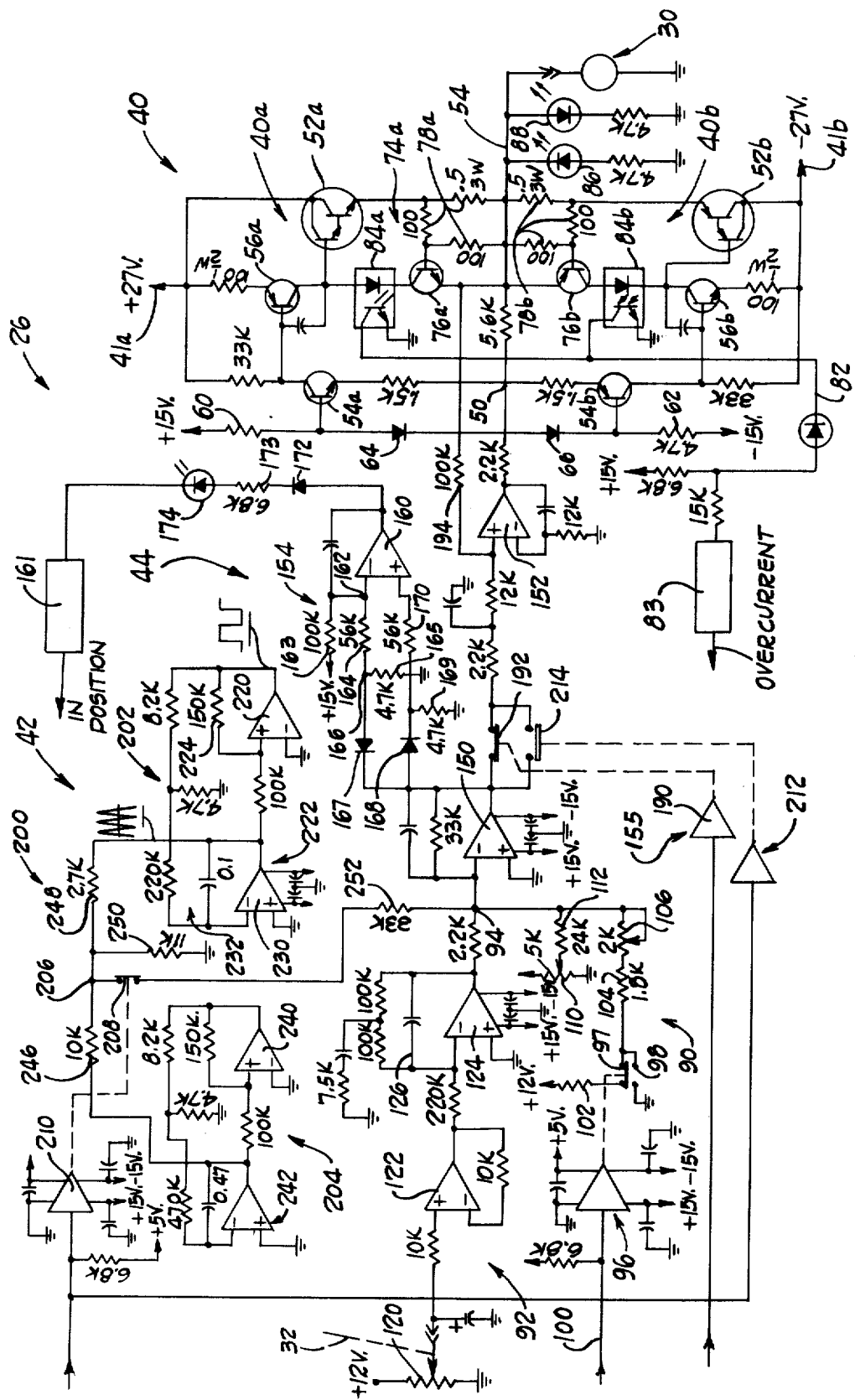
FIG. 2 is a schematic diagram of circuitry forming part of the system of FIG. 1.

Referring now to FIG. 2 the actuator controller 26 controls the direction of operation and speed of the motor 30 and comprises a motor energizing output circuit section 40, a control signal generator section 42 and a control signal processing circuit section 44 for receiving a control signal from the signal producing section 42 and responsive governing operation of the output section 40.

The output circuit section 40 is formed by a positive voltage motor driving network 40a and a negative voltage motor driving network 40b which are respectively connected between positive and negative DC power terminals (indicated by the reference characters 41a, 41b respectively) and circuit ground through an output line 54 and the motor 30. The output circuit section 40 is controlled by the voltage level supplied by the signal processing section 44 to an input junction 50 which is common to the networks 40a, 40b.

The positive voltage motor drive network 40a comprises a Darlington power transistor, indicated by the reference character 52a, connected between the positive power supply terminal and the motor 30 to variably control the current supplied to the motor. The conductive condition of the Darlington power transistor 52a is governed according to the voltage level at the input junction 50 by coacting control transistors 54a, 56a which are staged between the power transistor control electrode and the input junction 50. The control transistor 54a is illustrated as an NPN transistor having its base connected to the output junction of a voltage divider network formed by resistors 60, 62 and diodes 64, 66. The emitter of the transistor 54a is connected to the input junction 50 and the collector-emitter circuit is connected from the positive power supply terminal to the junction 50.

The transistor 56a is illustrated as a PNP transistor having its base connected to the collector of the transistor 54a and its emitter-collector circuit connected from the positive power supply terminal 41a to the power transistor control electrode. When the transistor 54a is rendered conductive, the voltage level at the base of the transistor 56a drops and the transistor 56a is rendered conductive.

When the voltage level at the input junction 50 is sufficiently negative with respect to the voltage level at the base of the control transistor 54a, the transistor 54a is rendered conductive resulting in the transistor 56a being rendered conductive to supply current to the base of the power transistor 52a. Operating current for the motor 30 is thus supplied from the positive power supply terminal via the power transistor 52a in accordance with the voltage level at the input junction 50.

The network 40a also includes an overcurrent signal generator 74a which produces an output signal whenever the motor current supplied by the power transistor 52a exceeds a predetermined level. The illustrated overcurrent signal generator 74a includes a transistor 76a having its base electrode connected to the output line 54 by a resistor network 78a and its collector-emitter circuit coupled to an overcurrent output signal line 82 by an optical isolator 84a. The isolator 84a is rendered conductive to produce a negative going overcurrent signal on the line 82 when the transistor 76a conducts. The overcurrent signal on the line 82 is suitably processed by a conventional output circuit 83 and transmitted to the central control unit.

The negative voltage motor drive network 40b is the same, in substance, as the positive voltage network 40a except the polarities of various transistors are reversed. Accordingly, the same reference characters, having a "b" postscript, are used for corresponding elements in the negative voltage network 40b and the network 40b is not described in detail. Suffice it to say that when the voltage level at the input junction 50 is sufficiently positive with respect to the voltage at the base of the control transistor 54b, that transistor is rendered conductive to render the control transistor 56b conductive and enable the Darlington power transistor 52b to supply current to the motor 30 from the negative power supply terminal. The overcurrent signal generator 84b is identical to the overcurrent generator 84a and produces a negative going signal on the line 82 if motor current exceeds a predetermined level when the network 40b is supplying power to the motor 30.

It should be appreciated that the diodes 64, 66 connected between the base electrodes of the transistors 54a, 54b provide for a narrow "dead band" of input junction voltage levels, centered on ground or zero voltage, to which neither of the motor energizing networks respond. In practice, the input junction voltage levels are only in the "dead band" when the grid assembly 20 is positioned precisely at or immediately adjacent the exposure or retracted positions. Grid assembly locations which are spaced appreciably from the exposure or retracted positions result in voltage levels at the input junction 50 which are substantially above or below ground.

In the illustrated circuitry, oppositely poled light emitting diodes 86, 88 are connected in parallel with the motor 30. The diode 86 emits light when the motor 30 is energized from the negative voltage motor driving network 40b and the diode 88 emits light when the motor 30 is energized from the network 40a. The diodes 86, 88 are primarly useful for diagnostic purposes during maintenance or repairs.

The level of the signal at the input junction 50 is governed primarily by the control signal generator section 42 which generates motor operating signals. The generator section 42 comprises grid assembly position command circuitry 90 and grid assembly position feedback circuitry 92 each producing an output delivered to a summing junction 94. The individual outputs are algebraically combined at the junction 94 to produce composite motor operating signal which is input to the signal processing section 42. The command circuitry 90 effectively produces position error signals which cause the grid assembly to be moved toward one or the other of its exposure or retracted positions. The position feedback circuitry 92 is operated to reduce the magnitude of the error signal as the grid assembly moves toward the desired position. The signal level at the junction 94 is zero (i.e. at ground potential) when the grid assembly reaches its desired position.

The grid assembly position command circuitry 90 is operated by a command signal from the central control unit to position the grid assembly at its retracted and exposure positions. The circuitry 90 includes a solid state relay 96 (schematically illustrated) forming the equivalent of a single pole, double throw switch having contacts indicated by reference characters 97, 98. The contacts 97, 98 alternatively connect the summing junction 94 to a positive reference voltage source or to ground in response to a command from the central control unit.

The relay 96 is normally in the condition illustrated by FIG. 2 of the drawings with the contacts 97 closed to connect the summing junction 94 to the reference voltage source. When a command signal is transmitted to the relay 96 via a command signal line 100 from the central control unit the relay contacts 97 open and the contacts 98 close to connect the junction 94 to ground. The relay contacts 97, 98 are associated with a resistance network formed by resistors 102, 104 and a calibration potentiometer 106 all connected in series between the summing junction 94 and the reference voltage source when the contacts 97 are closed. When the contacts 98 close, the summing junction 94 is connected to ground only through the resistor 104 and the potentiometer 106.

The circuitry 90 also includes a second resistance network formed by a potentiometer 110 and a resistor 112 connecting the summing junction 94 to the reference voltage source in parallel with the first mentioned resistance network.

The circuitry 90 is calibrated by adjusting the resistance networks to establish the grid assembly retracted and exposure positions. This is accomplished by providing a command signal to the relay 96 for closing the contacts 98. The grid assembly is consequently driven to the vicinity of its desired retracted position and stopped. The potentiometer 110 is then adjusted to cause the grid assembly to move to a desired retracted position. The command signal to the relay 96 is then discontinued causing the contacts 97 to close and the grid assembly to be driven to the vicinity of its exposure position and stopped. The potentiometer 106 is then adjusted so that the grid assembly is moved precisely to the desired exposure position.

The position feedback signal circuitry 92 provides a degenerative feedback signal to the junction 94 and stops motion of the grid assembly when it is precisely positioned at either the exposure position or the retracted position. When the command signal status on the line 100 changes the signal level at the summing junction 94 is abruptly maximized. The motor 30 is energized to move the grid assembly toward its alternative position with the position feedback signal circuitry 92 reducing the signal magnitude at the junction 94 until the grid assembly is repositioned with the input signal at ground. When the signal level at the junction 94 reaches zero volts, operation of the motor drive is terminated.

The position feedback signal circuitry 92 includes a feedback potentiometer 120 connected across a positive reference voltage source and having a slider driven by the grid assembly transmission 32 as the grid assembly moves. The voltage level at the slider of the potentiometer 120 provides a position feedback signal which is transmitted to the summing junction 94 by way of a buffer amplifier 122 and an operational amplifier 124. The output of the buffer amplifier is connected to the inverting input of the amplifier 124, the output of which is coupled to the summing junction 94. The amplifier 124 is equipped with an R-C feedback network 126 for damping oscillations of the position feedback signal from the feedback potentiometer 120. This tends to stabilize the signal at the junction 94 and minimize hunting and overshooting of the grid assembly positions.

The signal processing section 44 inverts and amplifies the signal at the summing junction 94 to provide the motor controlling signal input to the motor energizing section 40 as well as cutting off operation of the motor 30 when the grid assembly 20 is at or extremely close to its desired exposure position. The preferred signal processing section 44 comprises first and second amplifiers 150, 152 staged to provide amplification of the signal at the summing junction 94, an "in position" detection and control cicuit 154 for detecting the arrival of the grid assembly 20 in the immediate vicinity of its desired position, and stabilizing circuitry 155 for desensitizing the actuator controller 26 to slight variations in grid assembly location from a desired position when the grid assembly is essentially in the desired position.

The amplifiers 150, 152 are constructed and arranged so that the signal level at the motor energizing section input junction 50 is sufficient to assure motor operation even when the signal level at the summing junction closely approaches zero volts, thus asserting that the grid assembly continues to be driven at speed even as it closely approaches the exposure or retracted position. The amplifier 150 is an operational amplifier having its inverting input connected to the summing junction 94 and its output coupled to the noninverting input of the amplifier 152. The amplifier 152 is also an operational amplifier whose output is connected to the motor energizing section input junction 50. The overall gain of the amplifiers 150, 152 is approximately 105 (the gain of the amplifier 150 being about 15 while the gain of the amplifier 152 is relatively lower and preferably about 7). The amplifier 152 is thus saturated at all times except when the voltage at the summing junction 94 closely approaches zero volts (i.e., ground potential).

The voltage level at the motor energizing section input junction 50 is thus maintained at a maximum positive or negative level except when the grid assembly closely approaches a desired position at which time some modulation of the voltage level at the junction 50 occurs through a very narrow range of summing junction voltage above and below zero volts. The high gain of the signal processing section 44 thus assures that adequately large motor currents are available for operating the motor 30 even though the grid assembly may be extremely close to its desired position.

The "in position" circuitry 154 detects signal levels indicative of the grid assembly being substantially in one or the other desired position and transmits an "in position" signal to the central control unit. The "in position" signal, either alone or together with status signals produced by other components of the spot filmer, enables continuation of the spot filmer operating cycle upon arrival of the grid assembly to its desired exposure position. The central control unit does not permit continuation of the spot filmer operating routine until the "in position" signal is received from the actuator controller 26. The illustrated "in position" detection circuitry includes an amplifier 160 having input circuitry associated with it for causing it to operate as a comparator and for controlling output as a function of grid assembly position, and a signal producing device 161 connected to the amplifier output by which an "in position" signal is transmitted to the central control unit.

The amplifier 160 produces a positive output voltage when the grid assembly is out of position and a negative output voltage when the grid assembly is in or close to the exposure or retracted position. The amplifier 160 has its inverting input coupled to the output junction 162 of a voltage divider defined by resistors 163, 164, 165 connected between a positive 15 volt D.C. reference and ground. The voltage divider junction 166 is connected to the output junction of the amplifier 150 via a diode 167 poled to conduct current toward the output terminal of the amplifier 160. The noninverting input of the amplifier 160 is connected to the output of the amplifier 150 via a diode 168 and a resistor network defined by resistors 169, 170.

Whenever the output voltage level from the amplifier 150 exceeds a predetermined positive voltage level (established when the grid assembly is quite close to its exposure or retracted position), the voltage at the noninverting amplifier input becomes sufficient to cause the amplifier to produce a positive output signal.

Whenever the voltage level at the output of the amplifier 150 exceeds a predetermined negative voltage level (established when the grid assembly is quite close to its exposure or retracted position) the voltage level at the inverting input is sufficiently negative that the amplifier 160 produces a positive output voltage. When the output voltage of the amplifier 150 is between the predetermined levels the output from the amplifier 160 is negative. In the preferred circuitry the amplifier 160 produces a negative output voltage when the output from the amplifier 150 is in the range ± 6 volts.

The signal producing device 161 is connected to the output of the amplifier 160 via a diode 172 a resistor 173 and a light emitting diode 174. The diodes 172, 174 are pled to conduct when the output from the amplifier 160 is positive, i.e. when the grid assembly is out of position. When the grid assembly is in position, the output from the amplifier 160 is negative and the diodes 172, 174 block conduction between the device 161 and the amplifier 160. The device 161 is constructed and arranged to produce an output "in position" signal for transmission to the central control unit opnly in the absence of a signal input to it from the amplifier 160. At all other times the output from the amplifier 160 is positive and conditions the device 161 against producing an output "in position" signal. The device 161 can be of any suitable or conventional construction and therefore is not illustrated.

The preferred stabilizing circuitry 155 is operated from the central control unit, in response to receipt by the central control unit of the grid assembly "in position" signal, to effectively reduce the sensitivity of the actuator controller 26 to minor variances of the grid assembly location from its exposure position. The circuitry 155 is effective to open the circuit from the output of the amplifier 150 to the input of the amplifier 152 so that the input signal to the motor controller input junction 50 is altered to zero volts and the motor 30 deenergized. The illustrated stabilizing circuitry 155 comprises a solid state relay 190 defining the equivalent of normally closed relay contacts, indicated by the reference character 192, between the amplifiers 150, 152. The central control unit transmits a relay energizing signal to the relay 190 for opening the contacts 192 in response to the central control unit having received an "in position" signal from the circuitry 154.

When the contacts 192 open, the voltage at the input junction 50 shifts to zero volts. This occurs because the noninverting input of the amplifier 152 is connected to the output line 54 by a feedback resistor 194. The voltage levels on the output line 54 are of opposite polarity to those at the noninverting input of the amplifier 152 so that the feedback provided by the resistor 194 is degenerative in nature. The feedback resistor 194 thus assures that the voltage at the input junction 50 shifts to ground potential after the relay contacts 192 open.

Preferably the transmission of the relay energizing signal to the relay 190 is delayed for at least a fraction of a second after receipt of an "in position" signal from the "in position" circuitry 154. This delay provides for continued motion of the grid assembly toward its retracted or exposure positions after the "in position" signal is initially generated and thus enables the grid assembly to be more precisely positioned when the relay contacts 192 open.

Figure 3:
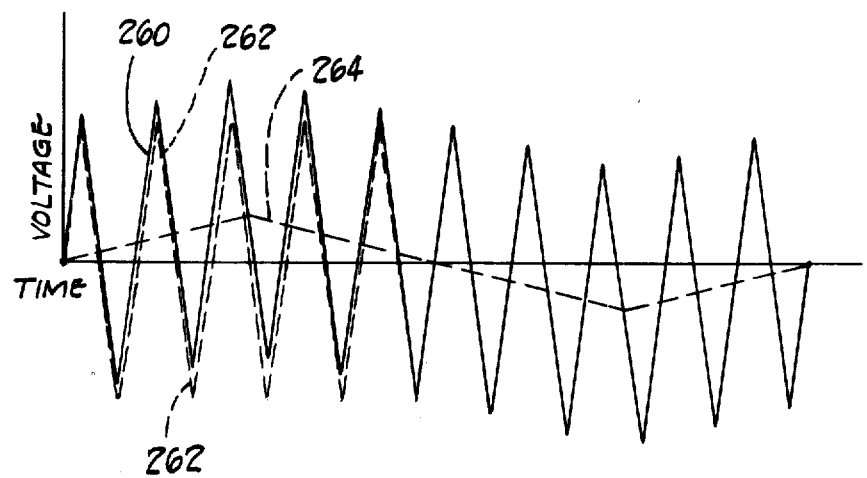
FIG. 3 is a graphic depiction of signals produced by part of the circuitry of FIG. 2.

In the circuitry illustrated by FIG. 3 the output circuit from the amplifier 150 is opened by the contacts 192 to reduce the gain of the signal processing section 44 to zero. If desired, the contacts 192 could be connected in parallel with a resistor whose value is selected to reduce the gain of the section 44 to some desired, relatively low, value.

In accordance with the present invention the grid assembly 20 is oscillated generally parallel to the plane of the image forming element 23 while an exposure is taking place with the extent of grid assembly displacement from its exposure position being altered during successive oscillations so that grid assembly displacement from the exposure position is not duplicated for a predetermined time interval which is relatively large compared to the maximum expectable exposure time. In the illustrated embodiment of the invention the grid assembly is cyclically shifted in accordance with input signals provided to the summing junction 94 during exposures by an oscillation signal generator 200. The signal generator 200 comprises first and second signal generating circuits 202, 204 whose outputs are connected together and algebraically combined at an output junction 206 which is, in turn, connectable to the summing junction 94 via contacts 208 of a solid state relay 210.

When an X-ray exposure is to be made, an exposure command signal is transmitted from the central control unit to the relay 210 to close the contacts 208 enabling transmission of signals from the junction 206 to the summing junction 94. The exposure command signal from the central control unit is simultaneously delivered to a solid state relay 212 whose contacts 214 are closed to connect the output of the amplifier 150 to the input of the amplifier 152 thus rendering the signal processing section 44 fully effective (i.e., restoring the gain of the section 44 to about 105) notwithstanding the fact that the relay contacts 192 operated as a result of "in position" signals from the "in position" circuitry remain open.

In the preferred and illustrated embodiment of the invention the signal generating circuits 202, 204 are oscillators for providing output signals to the junction 206 which differ in frequency and amplitude. The oscillator 202 comprises a comparator 220 having its output connected to the input of an integrator 222, its noninverting input connected to the integrator output and its inverting input connected to ground. A resistor 224 connected between the comparator output and input provides regenerative feedback to assure that the comparator produces a "square wave" output. In the illustrated embodiment the square wave output varies from 12 volts above ground to 12 volts below ground at a frequency determined by the integrator 222.

The integrator 222 alters the square wave output from the comparator 220 and produces an inverted output waveform characterized by positive going and negative going ramps. The integrator comprises an operational amplifier 230 having its inverting input coupled to the comparator output via an R-C network 232 and its output connected to the noninverting comparator input as well as to the output junction 206. The R-C network 232 comprises a resistor and capacitor which coact to alter the square wave to the ramp configuration referred to for input to the amplifier 230. The components of the R-C network are selected so that the frequency of the oscillating waveform output from the amplifier 230 is approximately 5 Hertz.

The oscillator circuitry 204 is essentially the same as the circuitry 202 and comprises a square wave producing comparator 240 whose output is fed to an integrator 242 for producing an inverted ramp waveform. The components of the R-C network of the integrator 242 differ from those of the R-C network 232 in that their values are selected to produce an oscillator output frequency of about 0.5 Hertz.

The oscillator outputs are connected to the junction 206 through respective output resistors 246, 248 whose values, in the preferred embodiment, are selected so that the waveform amplitude output from the oscillator 204 is about one third that of the oscillator 202.

The oscillator output waveform transmitted to the summing junction 94 is maintained at an amplitude which assures responsive operation of the drive motor 30 yet prevents the "in position" detection circuitry from indicating the grid assembly is out of its exposure position. The oscillator output junction 206 is therefore coupled to a resistance network formed by resistors 250, 252 which coact to limit the amplitude of the oscillator voltage output from the amplifier 150.

This limitation of the oscillator output prevents the voltage output from the amplifier 150 from exceeding plus or minus 6 volts relative to ground and therefore maintains the "in position" circuitry satisfied that the grid assembly is in its exposure position even though the grid assembly oscillates. Nevertheless, the motor 30 is fully energized by the oscillating signals applied to the summing junction 94 because of the large gain of the signal processing section 44. The grid assembly 20 is therefore driven at maximum speed except immediately adjacent the limits of its travel where it is accelerated and decelerated at high rates.

FIG. 3 graphically illustrates the composite waveform 260 output from the junction 206 to the junction 94 as a function of voltage versus time. The composite waveform 260 constitutes the algebraic combination of waveforms 262, 264, illustrated by broken lines, output from the oscillators 202, 204 respectively. As indicated previously the waveform 262 has an amplitude approximately three times the magnitude of the waveform 264 and a frequency of about 5 Hertz. The combination of these waveforms provides a resultant waveform whose positive and negative peaks occur at different voltage levels throughout a period of two seconds, which is the period of the low frequency oscillation.

The displacement of the grid assembly 20 from its nominal exposure position during any given oscillation is a function of the time during which the composite waveform 260 remains positive, or negative, with respect to ground. As indicated by FIG. 3 the extend of this time is different for each oscillation during the two second period of the low frequency oscillation. X-ray film exposure times rarely exceed three or four seconds and therefore the number of times the grid assembly stops at a given location during any single exposure is minimized.

The difference in distance between the maximum grid assembly displacement from the exposure position and the minimum displacement distance is preferably less than the grid strip spacing so that different grid strips do not stop at the same location during the grid oscillation period. This distance differential is controlled by appropriate selection of the frequency and amplitudes of the waveforms 262, 264.

While only a single embodiment of the present invention has been illustrated and described herein in considerable detail the present invention is not to be considered limited to the precise construction disclosed. Various adaptations, modifications and uses of the invention may occur to those skilled in the art to which the invention relates and the intention is to cover all such adaptations, modifications and uses which fall within the spirit or scope of the appended claim.

I claim:

1. A method for producing a transparency image of an object subjected to penetrative radiation comprising:
   (a) positioning a generally planar image forming element at a predetermined position relative to a source of penetrative radiation;
   (b) stationing a grid assembly at an exposure position between the radiation source and the image forming element;
   (c) directing penetrative radiation to said image forming element for a predetermined time; and,
   (d) oscillating the grid assembly in a direction generally parallel to said plane at a first relatively constant frequency and altering the extent of grid assembly displacement from said exposure position during successive oscillations by cyclically shifting said grid assembly at a second substantially lower relatively constant frequency so that the grid assembly displacement in one direction of motion from the exposure position is not duplicated for a period which is relatively large compared to said time.

2. The method claimed in claim 1 wherein cyclically shifting the grid assembly includes shifting the grid assembly in the same direction as the grid assembly is oscillated.

3. The method claimed in claim 1 wherein oscillating the grid assembly comprises reciprocating the grid assembly at a substantially constant amplitude and cyclically shifting the grid assembly comprises shifting the grid assembly at a substantially constant amplitude.

4. A method of shifting a grid while exposing a photographic film to penetrative radiation comprising:
   (a) interposing a grid assembly between a source of penetrative radiation and film;
   (b) oscillating the grid assembly in a plane generally parallel to the film at a relatively low frequency; and
   (c) vibrating the grid assembly at a substantially high frequency while oscillating the grid so that successive alternate reversals of grid assembly direction occur at different locations relative to the film.

5. The method claimed in claim 4 wherein the grid is oscillated at a fractional hertz frequency and the grid is vibrated at a frequency of several hertz.

6. The method claimed in claim 4 wherein the ratio of the vibration frequency to the oscillation frequency is approximately 10:1.

7. The method claimed in claim 4 wherein the period of oscillation of the grid assembly is no less than about two seconds, and the period of said vibrations is substantially less than one second.

8. The method claimed in claim 7 wherein the amplitude of said vibrations is substantially greater than the amplitude of said oscillations.

9. An X-ray grid shifting arrangement comprising:
 (a) a grid assembly; and
 (b) a grid assembly actuator system for shifting the position of said grid assembly;
 (c) said actuator system comprising actuator means and actuator controller means, said actuator controller means comprising:
  (i) first signal producing means for producing a first actuator controlling signal whose value changes cyclically; and
  (ii) second signal producing means for producing a second actuator controlling signal whose value changes cyclically at a substantially different frequency from that of said first actuator controlling signal;
  (iii) said actuator controller means operating said actuator means to cyclically shift the position of said grid assembly as a function of said first and second signals.

10. The X-ray grid shifting arrangement claimed in claim 9 wherein said grid actuator means comprises an electrically energized actuator and said first and second signal producing means comprises electrical circuits producing cyclical electrical actuator controlling signals.

11. The X-ray grid shifting arrangement claimed in claim 10 wherein said actuator comprises a reversible motor for shifting said grid along a predetermind path, said actuator controller means operating said motor to oscillate said grid assembly along said path.

12. The X-ray grid shifting arrangement claimed in claim 10 wherein said first and second signal producing means are coupled together so that the algebraic sum of said first and second signals governs operation of said actuator to oscillate said grid assembly along a generally rectilinear path.

13. The arrangement claimed in claim 12 wherein said first and second signal producing means comprise electrical oscillators for producing trains of pulses, said first actuator controlling signal defined by a pulse train having a greater frequency and greater amplitude than the pulse train defining said second actuator controlling signal.

* * * * *